United States Patent [19]

Ting

[11] Patent Number: 4,743,485
[45] Date of Patent: May 10, 1988

[54] VENTED COMPOSITE FOAM PANEL

[76] Inventor: Raymond M. L. Ting, 318 Holiday Dr., Pittsburgh, Pa. 15237

[21] Appl. No.: 38,968

[22] Filed: Apr. 16, 1987

Related U.S. Application Data

[63] Continuation-in-part of Ser. No. 877,412, Jun. 23, 1986.

[51] Int. Cl.⁴ .......................... B32B 3/00; B32B 3/18; E04C 1/00
[52] U.S. Cl. ..................................... 428/109; 52/232; 52/302; 52/309.9; 52/309.11; 428/110; 428/114; 428/309.9; 428/317.5; 428/319.1
[58] Field of Search ............. 52/232, 302, 303, 309.9, 52/309.11; 428/107, 109, 110, 111, 114, 305.5, 316.6, 319.1, 309.9, 317.5

[56] References Cited

U.S. PATENT DOCUMENTS

| | | | |
|---|---|---|---|
| 2,438,528 | 3/1948 | Wilhelm et al. | 52/302 |
| 3,459,628 | 8/1969 | Dixon et al. | 428/305.5 |
| 3,598,688 | 8/1971 | Bellamy | 428/315.5 |
| 3,619,961 | 11/1971 | Sterrett et al. | 52/302 |
| 4,121,958 | 10/1978 | Koonts | 428/305.5 |
| 4,292,369 | 9/1981 | Ohashi et al. | 428/319.1 |
| 4,351,873 | 9/1982 | Davis | 428/317.1 |
| 4,414,265 | 11/1983 | Rosato et al. | 428/316.6 |
| 4,459,334 | 7/1984 | Blanpied et al. | 428/319.1 |

Primary Examiner—William J. Van Balen
Attorney, Agent, or Firm—William J. Ruano

[57] ABSTRACT

A composite foam panel with an outer metal skin and an inner metal skin which sandwich a structural foam core. The thermal blistering problem, which is common to a composite foam panel is solved by this invention by using an internal gas venting system adjacent the inner surface of at least one of the outer skins of the panel.

7 Claims, 2 Drawing Sheets

VENTED COMPOSITE FOAM PANEL

This invention is a continuation-in-part of my patent application Ser. No. 06/877,412 filed June 23, 1986 pending.

This invention relates to building wall or roof structures and, more particularly, to composite foam panels with metal skins.

BACKGROUND OF THE INVENTION

1. Field of the Invention

The metal skins of foam panels are commonly painted carbon steel, aluminum, or stainless steel of thickness ranging from 0.018" (0.46 mm) to 0.048" (1.22 mm). A structural foam core is sandwiched between two metal skins to form a composite panel structure through chemical or adhesive bond between the foam core and the metal skins.

2. Description of the Prior Art

Composite metal foam panels have been widely used in building wall and roof structures due to their high strength-to-weight ratio and their high insulation value. The depth of the panel normally ranges from 1 inch (25 mm) to 8 inches (203 mm) depending on load or thermal insulation requirements. The width of the panel normally ranges from 12 inches (305 mm) to 48 inches (1219 mm). The panels are fastened to the building frame members such as horizontal wall girts, vertical mullions, or roof purlins in a side-by-side fashion to form the wall or the roof surface.

In a mass production facility, the pour-in-place process is commonly used in which liquid foam is deposited between the two metal skins and contained in a jig to resist the foaming pressure and to retain the shape of the final product. Freon gas is commonly used as the blowing agent in the foam system. The chemical bond developed between the foam core and the metal skin cannot be uniform throughout the contacting surface. Localized weak bonding areas are normally developed due to skin surface contamination, void formation, or cell distortion due to the rolling of foam cells during the foaming process.

When one of the metal skins is subjected to a high surface temperature, such as due to solar gain in an exterior exposure condition, the thermal expansion of the metal skin and the heat causes stretching of the foam cells near the skin, producing an imbalance of the internal pressure of the freon gas contained in the foam cells. This pressure imbalance causes the freon gas to migrate slowly toward the warmer skin. When the developed freon pressure, acting beneath the metal skin, is adequate to overcome the bond strength, metal skin delamination will happen. This type of skin delamination will happen first at the localized weak bonding areas causing localized skin bulging in these areas. This phenomenon is known as thermal blister in the industry. This thermal blistering problem causes not only a reduction in the structural properties of the panel, but also a serious aesthetic problem.

Drilling a small hole through the metal skin to release the freon gas and rebonding the metal skin to the foam core by injecting adhesive through the hole have been used at the job site to repair the thermal blisters. However, this type of repair work is not only costly, but it is also impossible to restore the panel shape perfectly. Replacing the blistered panels does not only involve significant cost, but also cannot guarantee that no additional thermal blister will be developed in the replaced panels.

Since the localized weak bonding areas are concealed beneath the metal skin, there is no readily available easy method for detecting the weak bonding areas. The only known method in the industry is the thermal blistering test where the metal skin is subjected to sustained heating using heat lamps to see if thermal blisters can be developed at the target surface temperature. Normally, each test requires at least two hours of heat exposure to simulate the solar gain condition. Ideally, the job site thermal blistering problem can be prevented if all panels are subjected to the thermal blistering test before shipping to the job site.

However, it is totally impractical and cost-prohibitive due to the required long testing duration. Therefore, only sampe testing is utilized by the panel manufacturers to prevent the likelihood of massive product failures due to thermal blistering and the risk of some panel blisterings is assumed. The composite metal foam panel manufacturers have faced this thermal blistering problem for years without finding a real solution to the problem. Some panel manufacturers have been forced out of the business due to the thermal blistering problem.

SUMMARY OF THE INVENTION

The thermal blistering problem in a composite foam panel is prevented by the present invention by providing an internal freon gas venting system at, or near, the bonding surface between the metal skin and the foam core.

The bending strength of a composite panel relies on the composite bond between the exterior metal skins and the foam core. The composite bond is lost in the area of the gas venting channels. In order to maintain adequate bending strength of the composite panel, the surface bonding area occupied by the gas venting channels must not significantly reduce the bonding surface between the exterior metal skin and the foam core. It is preferred that the surface bonding area occupied by the gas venting channels is less than ten percent of the total bonding surface area of the exterior metal skin.

The key to the present invention is to provide gas venting channels in the finished composite panel allowing the gas developed within the foam core to flow through the gas venting channels and to exit at the exposed foam core perimeters.

To install the venting channels in a composite panel manufactured by the pour-in-place process, the following methods can be utilized.

The first method is to bond a string of porous material onto the interior side of the metal skin before foaming. The suitable material commercially available for this application is the open cell urethane foam rod such as that with the trade name of "Denver Foam". However, during the foaming process, part of the liquid foam will be absorbed by the porous string material. It is important to use a size big enough to prevent total penetration of the liquid foam into the porous string material since total penetration of the liquid foam would seal off all voids within the porous string material rendering the gas venting mechanism inoperable.

The second method is to bond a string of porous material with a thin outer membrane onto the interior side of the metal skin before foaming. The thin outer membrane is repellant to the penetration of liquid foam but yet weak enough to allow the penetration of gas under pressure. The suitable material commercially available for this application is the polyvinyl chloride foam extrusions such as that with the trademark Norex PVC Foam Extrusions. Depending on the size of thermal blister and the rigidity of the exterior metal skin, the gas pressure required to force the skin into a detectable blister is estimated to range from one to three pounds per square inch. To effectively eliminate the development of the thermal blister, the resistance against the gas penetration of the outer membrane in this type of material must be less than the blistering gas pressure.

The third method is to bond a tape onto the interior side of the metal skin before foaming, whereby the surface of the tape to be in contact with the liquid foam is coated with non-sticking material such as Teflon, grease, or wax. Due to the non-sticking surface of the tape, a very small gap is created in the finished product at the contact surface between the tape and the foam core allowing gas venting through the small gap.

The fourth method is to lay a strong string such as a metal wire or rope on or near the interior surface of the metal skin before foaming and to pull out the string after the foam core has been solidified. After the string has been pulled out, the necessary void for gas venting is formed. To reduce the resistance of pulling out the string, it is preferred to coat the string with a non-sticking material, such as Teflon, grease or wax. In all the methods described above, the venting lines must be terminated at the exposed foam core perimeters so that the gas can be released to the outside environment.

DESCRIPTION OF THE PREFERRED EMBODIMENT

Figure 1:
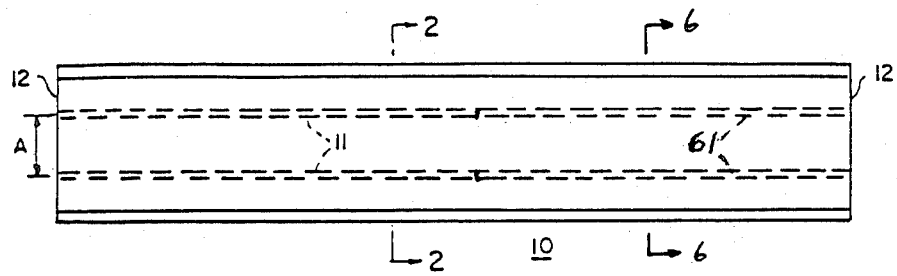
FIG. 1 shows a plan view of a typical composite foam panel of the present invention with longitudinal freon gas venting channels.

FIG. 1 shows a plan view of a typical composite foam panel 10 of this invention with two different gas venting channel profiles. Shown by the dotted lines are longitudinal freon gas venting channels 11 and 61, 61 which run substantially parallel to the direction of panel length starting from the central region of the panel and terminate at the panel ends 12 where the foam core is exposed. The freon gas venting channels 11 and 61 are open at the panel ends 12 for allowing the freon gas to be vented to the outside as will be explained in more detail in relation to FIG. 2 and FIG. 6.

Figure 2:
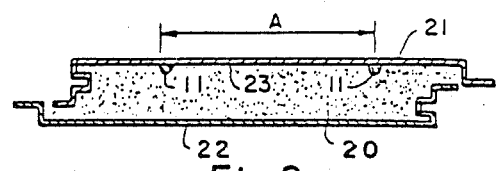
FIG. 2 shows the cross-sectional view taken along line 2—2 of FIG. 1.

FIG. 2 shows the cross-sectional view taken along line 2—2 of FIG. 1. The structural foam core 20 is adhered to a metal skin 21 which will be subjected to an elevated surface temperature and another metal skin 22 on the opposite side. The longitudinal freon gas venting channels 11 are installed at or near the interior surface 23 of the metal skin 21.

The freon gas venting channels 11 represent strings of porous material installed in accordance with the aforementioned first or second method or voids formed in accordance with the aforementioned fourth method.

When the metal skin 21 is subjected to a high temperature, the freon gas contained within the foam core 20 will start to migrate toward the interior surface 23 of the metal skin 21 building up an internal gas pressure. Since the venting channels 11 are open at the panel ends 12 (shown in FIG. 1), the entire venting channels 11 become low pressure regions. Therefore, the freon gas will start to flow into the venting channels 11 for venting at the ends 12. A constant pressure difference will be maintained when a steady gas flow condition is reached. The pressure difference should be designed to be lower than the bond strength between the metal skin and the foam core. The pressure difference is affected by the distance "A" between the venting channels, the size and porosity of the venting channel material, and the cell structure and density of the foam core. For a given foam core structure and a given venting channel material and size, a suitable venting channel spacing "A" can be determined by trial-and-error procedure. For a narrow panel, one venting channel may be adequate, and for a wide panel, more than two channels may be used. It is preferred to use a half-moon shape for the venting channel 11 to facilitate the flow of liquid foam during the foaming process.

Figure 3:
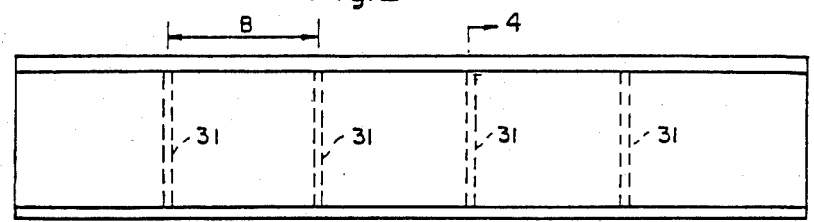
FIG. 3 shows a plan view of a typical composite foam panel of this invention with transverse freon gas venting channels.

FIG. 3 shows a plan view of a typical composite foam panel 30 of this invention with a plurality of transverse freon gas venting channels 31 spaced apart at a distance "B". In this arrangement, the freon gas will be vented to the side of the panel 30 where the foam core is exposed as will be explained in more detail in FIG. 4.

Figure 4:
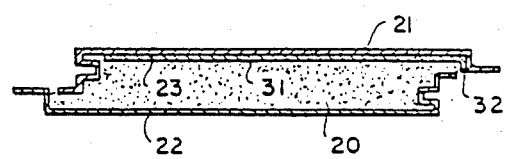
FIG. 4 shows the cross-sectional view taken along line 4—4 of FIG. 3.

FIG. 4 shows a cross-sectional view taken along line 4—4 of the panel 30 of this invention. The venting channels 31 which are similar to the venting channels 11, are installed on or near the interior surface 23 of the metal skin 21 which will be subjected to elevated temperature. The end 32 of the venting channel 31 is open to the outside at the exposed foam core perimeter along the panel side to allow the venting of interior freon gas. The foam core 20 is structurally adhered to the metal skins 21 and 22 to form a composite panel. The suitable spacing "B" has been explained in the description of FIG. 2. When the metal surface 21 is subjected to elevated temperature, the freon gas contained in the foam core 20 will migrate toward the interior surface 23 of the metal skin 21 creating a freon gas flow into the venting channels 31 leading to the freon gas venting at the end 32 of each venting channel 31.

Figure 5:
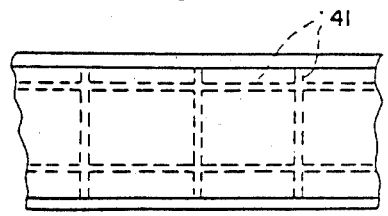
FIG. 5 shows a plan view of a further modification having grid-like venting channels.

The freon gas venting system of the present invention is applicable to any metal skin profiles not shown in FIG. 2 and FIG. 4. To increase the freon gas venting efficiency, the pattern of the venting channels can vary in any other manner such as a sinusoidal or winding path or a grid pattern 41 (FIG. 5). If the panel will be subjected to elevated temperatures on both sides, the freon gas venting system can be applied on both metal skins. The freon gas venting system will also limit the degree of foam core shrinkage in cold temperature. When the foam panel is subjected to a temperature near the dew point of the freon gas, significant vacuum will be created within the foam cells resulting in sucking the exterior air into the foam cells through the venting system to neutralize the vacuum. This reverse venting phenomenon will help to prevent excessive shrinkage of the foam core.

Figure 6:
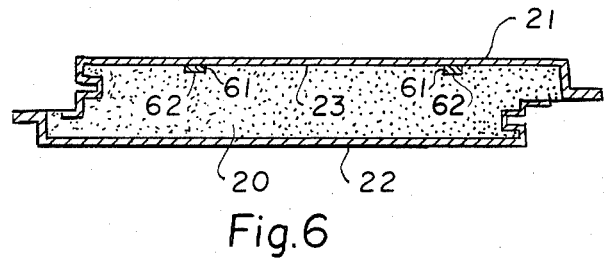
FIG. 6 shows the cross-sectional view taken along line 6—6 of FIG. 1 of a modification of FIG. 2.

FIG. 6 shows a cross-sectional view taken along line 6—6 of FIG. 1 of a modification of the panel 10 shown in FIG. 2. The structural core 20 is adhered to a metal skin 21 which will be subjected to an elevated surface temperature and another metal skin 22 on the opposite side. The tapes 61 are adhered to the interior surface 23 of the metal skin 21 before foaming. The surfaces 62 of the tapes 61 are coated with non-sticking agent such as Teflon, grease or wax. After foaming, the foam core 20 is in contact with the surfaces 62. Due to the non-sticking coating on the surfaces 62, the unbonded shims between the foam core 20 and the surfaces 62 become the freon venting channels.

While I have illustrated and described several embodiments of my invention, it will be understood that these are by way of illustration only and that various changes and modifications may be contemplated in my invention and within the scope of the following claims.

I claim:

1. In a building panel wall assembly formed from individual building panels, installed in side-by-side relationship, each panel having two exterior metal skins adhesively connected to a structural foam core along the inner surfaces of said exterior metal skins, said foam core having exposed perimeters along the ends and the sides of said panel, wherein each panel is of a construction formed by depositing liquid foam resin between said two exterior metal skins restrained in a jig during the curing period; the improvement comprising at least one gas venting channel formed near said inner surface of one of said exterior metal skins, said gas venting channel starting near the central region of said panel and running continuously to a termination point at one of said exposed foam core perimeters.

2. The improvement of claim 1 wherein the surface area of said gas venting channels is less than ten percent of the area of said inner surface of said exterior metal skin.

3. A gas venting channel as recited in claim 1 wherein said gas venting channel is formed by bonding a string of open cell urethane foam rods onto said inner surface of said exterior metal skin before foaming, said foam rod having sufficient size to prevent total absorption of said liquid foam.

4. A gas venting channel as recited in claim 1 wherein said gas venting channel is formed by bonding a string of extruded polyvinyl chloride foam rod onto said inner surface of said exterior metal skin before foaming, said foam rod having an outer thin membrane repellant to liquid foam absorption and permeable to pressurized gas.

5. A gas venting channel as recited in claim 1 wherein said gas venting channel is formed by bonding a narrow tape onto said inner surface of said exterior metal skin before foaming, said tape having a non-sticking coat on the surface to be contacted with said foam core.

6. A gas venting channel as recited in claim 1 wherein said gas venting channel is formed by laying a string near said inner surface of said exterior metal skin before foaming and pulling said string out after solidification of said foam core, said string having sufficient strength to prevent breakage during said pulling out operation.

7. The improvement of claim 6 wherein said string is coated with a non-sticking agent to reduce the resistance of said pulling out operation.

* * * * *